United States Patent Office 2,811,522
Patented Oct. 29, 1957

2,811,522

PREPARATION OF 5,6-DICHLORO-PREGNANE-3,17-DIOL-20-ONE FROM ESTERS OF 5,6-DICHLORO-16-PREGNENE-3-OL-20-ONE

Frank A. Cutler, Jr., Westfield, N. J., assignor to Merck & Co., Inc., Rahway, N. J., a corporation of New Jersey No Drawing. Application February 10, 1955,
Serial No. 487,459

16 Claims. (Cl. 260—239.55)

This invention is concerned generally with novel processes for preparing keto-substituted-3-hydroxy-cyclopentanopolyhydrophenanthrene compounds. More particularly, it relates to a novel process for converting $\Delta^{16}$-5,6-dichloro-pregnene-3-ol-20-one esters to 5,6-dichloropregnane-3,17-diol-20-one. The latter compound is useful as an intermediate in the preparation of $\Delta^4$-pregnene-17,21-diol-3,20-dione, commonly called Substance S, which, in turn, is readily converted by microbiological methods to the adrenal hormone, hydrocortisone.

In accordance with this novel process, an ester of $\Delta^{16}$-5,6-dichloro-pregnene-3-ol-20-one (Compound 1 hereinbelow) is reacted with alkaline hydrogen peroxide to form 16,17-oxido-5,6-dichloro-pregnane-3-ol-20-one (Compound 2) which, upon reaction with an alkali metal aluminum hydride, forms 5,6-dichloro-pregnane-3,17,20-triol (Compound 3); the latter compound is reacted with an oxidizing agent to produce 5,6-dichloropregnane-3,17-diol-20-one (Compound 4). These reactions may be chemically represented as follows:

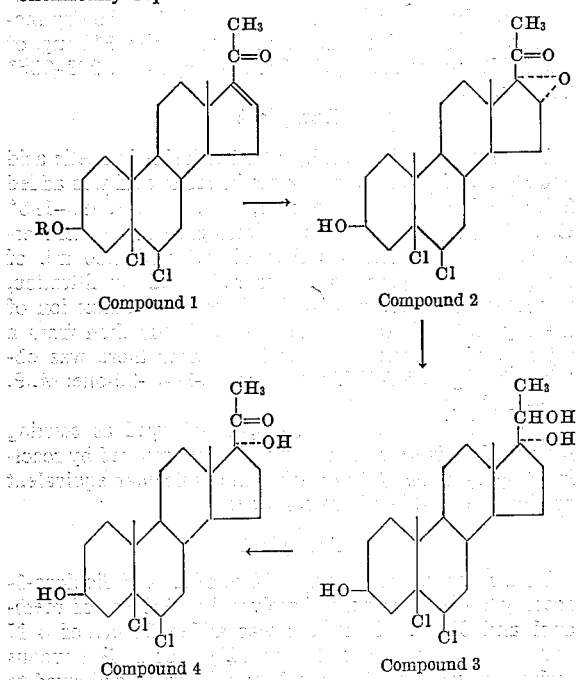

Compound 1    Compound 2

Compound 4    Compound 3 wherein R is an acyl radical.

The $\Delta^{16}$-5,6-dichloro-pregnene-3-ol-20-one esters, utilized as starting materials in carrying out the present process, can be prepared by reacting the corresponding ester of $\Delta^{5,16}$-pregnadiene-3-ol-20-one with chlorine. This reaction is conveniently conducted by dissolving the $\Delta^{5,16}$-pregnadiene-3-ol-20-one ester in choloform containing a small amount of pyridine, cooling the resulting solution to a temperature of about −60° C., and adding to this solution a solution of chlorine in carbon tetrachloride. The temperature of the resulting mixture is allowed to rise to about 15° C. thereby completing the reaction, and the $\Delta^{16}$-5,6-dichloro-pregnene-3-ol-20-one ester is recovered from the reaction mixture by conventional means. In accordance with this procedure, there are obtained $\Delta^{16}$-5,6-dichloro-3-alkanoyloxy-20-keto-pregnenes such as $\Delta^{16}$-5,6-dichloro-3-acetoxy-20-keto-pregnene, $\Delta^{16}$-5,6-dichloro-3-propionoxy-20-keto-pregnene, $\Delta^{16}$-5,6-dichloro-3-butyroxy-20-keto-pregnene, $\Delta^{16}$-5,6-dichloro-3-aroyloxy-20-keto-pregnenes such as $\Delta^{16}$-5,6-dichloro-3-benzoxy-20-keto-pregnene, and the like.

In carrying out the presently invented process, the $\Delta^{16}$-5,6-dichloro-pregnene-3-ol-20-one ester is dissolved in an organic solvent, preferably a lower alkanol such as methanol, which may contain, if desired, a small amount of a hydrocarbon solvent such as benzene. The resulting solution is brought into contact with an aqueous alkaline solution of hydrogen peroxide, which is ordinarily prepared by dissolving hydrogen peroxide in an aqueous solution of an alkali metal hydroxide such as sodium hydroxide, potassium hydroxide, and the like. The resulting mixture is allowed to stand in the cold, preferably at a temperature of about 0 to 5° C. for a period of about 15 hours. The crystalline material which separates from the reaction mixture is recovered by filtration and dried to give substantially pure 16,17-oxido-5,6-dichloro-pregnane-3-ol-20-one. The $\Delta^{16}$-5,6-dichloro-pregnene-3-ol-20-one esters are critical as starting materials since the 5,6-dichloro radicals are not affected by the aqueous alkaline conditions prevailing during the hydrogen peroxide reaction whereas, in the case of the corresponding brominated derivative, the 5,6-dibromo radicals would be hydrolyzed. Since these aqueous conditions do effect hydrolysis of the ester grouping in the 3-position, the identical product is obtained irrespective of the ester substituent present in the starting material.

The 16,17-oxido-5,6-dichloro-pregnane-3-ol-20-one is dissolved in an organic solvent, preferably a mixture of a dialkyl ether such as diethyl ether and a hydrocarbon solvent such as benzene. This solution is brought into contact with a solution of an alkali metal aluminum hyride, preferably lithium aluminum hydride, in a dialkyl ether such as diethyl ether, and the resulting mixture is heated, preferably under reflux, thereby effecting reduction of the 16,17-oxido substituent and the 20-keto group. The reaction mixture is diluted with aqueous acid, after first decomposing any unreacted alkali metal aluminum hydride with alcohol, and the water-immiscible organic layer is separated from the resulting mixture. Upon evaporating the solvents from this organic layer, there is obtained the reduction product, 5,6-dichloropregnane-3,17-20-triol.

A further critical feature of this invention is the discovery that the 20-hydroxy substituent of 5,6-dichloropregnane-3,17,20-triol can be selectively oxidized to a 20-ketone without substantially affecting the 3-hydroxy grouping, providing that the oxidizing agent is of the positive halogen type.

Ordinarily 3-hydroxy groups are oxidized by positive halogen type oxidizing agents such as N-haloamides and chlorine. However, it is now discovered that, when chloro radicals are attached to the C-5 and C-6 carbon atoms, the C-3 hydroxy group is not oxidized by these positive halogen type oxidizing agents. Accordingly, when a 5,6-dichloro-pregnane-3-ol compound containing at least one additional secondary alcohol substituent in the molecule as for example a 5,6-dichloro-pregnane-3,20-diol compound such as 5,6-dichloro-pregnane-3,20-diol per se; 5,6-dichloro-pregnane-3,20,21-triol 21-alkanoate; 5,6-dichloro-pregnane-3,20,21-triol 21-acetate; 5,6-dichloro-pregnane-3,17,20-triol; 5,6 - dichloro - pregnane-3,17,20,21-tetrol 21-acylate; 5,6-dichloro-pregnane-3,17,20,21-tetrol 21-acetate; 5,6-dichloro-pregnane-3,11-diol; 5,6-dichloro-pregnane - 3,11,20-triol; 5,6-dichloro-pregnane-3,11,17-triol; 5,6 - dichloro-pregnane - 3,11,21-triol 21-alkanoate; 5,6 - dichloro-pregnane-3,11,21-triol 21-acetate; 5,6-dichloro-pregnane-3,11,17,20 - tetrol; 5,6-dichloro-pregnane - 3,11,20,21 - tetrol 21-acylate; 5,6-dichloro-pregnane - 3,11,20,21 - tetrol 21 - acetate; 5,6-dichloroloro - pregnane - 3,11,17,21-tetrol 21 - acylate; 5,6-dichloro-pregnane - 3,11,17,21-tetrol 21 - acetate; 5,6-dichloro-pregnane-11-one-3,17,20,21-tetrol 21-acylate; 5,6-dichloro-pregnane-11-one-3,17,20,21 - tetrol 21 - acetate; and the like, is reacted with an oxidizing agent of the positive halogen type, as for example chlorine, an N-haloamide, such as N-bromacetamide, N-bromsuccinimide, hypohalites such as tertiary butyl hypochlorite, and the like, the additional secondary alcohol substituent is selectively oxidized to ketone, without affecting the 3-hydroxy grouping, thereby forming the corresponding keto-substituted-5,6-dichloro - pregnane-3-ol compound as for example 5,6-dichloro-pregnane-3-ol-20-one; 5,6 - dichloro-pregnane-3,21-diol - 20-one 21-alkanoate; 5,6-dichloro-pregnane-3,17-diol-20-one; 5,6-dichloro-pregnane-3,21-diol-20-one 21 acylate; 5,6-dichloro-pregnane-3,17,21-triol-20-one 21-alkanoate; 5,6-dichloro-pregnane-3,17,21-triol-20-one 21-acetate; 5,6-dichloro-pregnane-3-ol-11-one; 5,6-dichloro - pregnane-3-ol-11,20-dione; 5,6 - dichloro-pregnane - 3,17-diol-11-one; 5,6-dichloro-pregnane-3,21-diol-11-one 21-acylate; 5,6-dichloro-pregnane-3,21-diol-11-one 21-acetate; 5,6-dichloro-pregnane-3,17 - diol - 11,20-dione; 5,6-dichloro-pregnane-3,21-diol-11,20-dione 21-acylate; 5,6-dichloro-pregnane-3,17,-21-triol-11-one 21-acylate; 5,6-dichloro-pregnane-3,17,21-triol-11,20-dione 21-acylate; 5,6-dichloro-pregnane-3,17,-21-triol-11,20-dione 21-acetate; and the like.

When chlorine is used as the oxidizing agent, the reaction is ordinarily carried out in a liquid diluent inert to chlorine such as a lower alkanoic acid, preferably acetic acid containing sodium acetate. The reaction can be effected at room temperature or above, and is ordinarily complete after a reaction period of about twenty-four hours at room temperature. The resulting keto-substituted-5,6-dichloro-pregnane-3-ol compound is conveniently precipitated from the alkanoic acid reaction mixture by diluting the mixture with water, and the precipitated material is recovered by filtration, dried, and purified, if desired by recrystallization from an organic solvent such as benzene to give the keto-substituted-5,6-dichloro-pregnane-3-ol compound in substantially pure form.

The reaction between the 5,6-dichloro-pregnane-3-ol compound containing at least one additional secondary alcohol substituent and the N-haloamide is conveniently conducted by bringing the reactants together in a liquid diluent relatively inert to N-haloamides, as for example a tertiary alkanol or methanol, or a mixture of such tertiary alkanol or methanol with a halogenated hydrocarbon solvent (preferably a mixture of methanol and chloroform), adding to the resulting solution a small amount of a tertiary amine such as pyridine as catalyst, and then adding a solution of an N-haloamide, such as N-bromacetamide, in an aqueous alcohol solvent. The oxidation reaction, whereby additional secondary alcohol substituents present in the molecule are selectively oxidized to keto groups, without oxidizing the 3-hydroxy grouping, is ordinarily conducted by allowing the mixture of reactants to stand in the dark at room temperature for an extended period of time, preferably about four days. The reaction mixture is treated with a small amount of allyl alcohol to decompose unreacted N-haloamide, aqueous acid is added to the mixture, and the steroid components are extracted from the resulting mixture utilizing a water-immiscible organic solvent such as chloroform. The organic solvents are evaporated from the organic layer, the residual material is triturated with a hydrocarbon solvent such as benzene, and the unchanged starting material, which ordinarily separates as a crystalline slurry, is recovered by filtration. The benzene liquors are chromatographed on acid-washed alumina, and the chromatogram is eluted with benzene and mixtures of benzene and chloroform to give the desired keto-substituted-5,6-dichloro-pregnane-3-ol compound.

These keto-substituted-5,6-dichloro-pregnane-3-ol compounds possess advantages over the corresponding 3-ketones both as regards stability and in certain reactions, particularly in those involving the introduction of bromine at C–21 in which reaction the 3-keto substituent would cause concomitant bromination in ring A. For example, 5,6-dichloro-pregnane-3,17-diol-20-one can be reacted with bromine to form the 21-bromo derivative (without appreciable bromination in ring A). The resulting 5,6-dichloro-21-bromo-pregnane-3,17-diol-20-one is reacted with potassium acetate in acetone to produce 5,6-dichloro-pregnane-3,17,21-triol-20-one 21-acetate. The latter compound can then be reacted with chromic acid to produce 5,6 - dichloro - pregnane - 17,21 - diol - 3,20 - dione 21-acetate; and this 5,6-dichloro-pregnane-17,21-diol-3,20-dione 21-acetate is reacted with chromous chloride to form $\Delta^4$-pregnene-17,21-diol-3,20-dione 21-acetate, which, upon reaction with aqueous sodium hydroxide, is converted to $\Delta^4$-pregnene-17,21-diol-3,20-dione (Substance S).

The following examples illustrate methods of carrying out the present invention but it is to be understood that these examples are given for purposes of illustration and not of limitation.

*Example 1*

To 500 mg. of 5,6-dichloro-pregnane-3$\beta$,17,20-triol (M. P. 198–199° C.) was added a mixture of 3.7 ml. of a 1 M solution of chlorine in acetic acid and 7.63 ml. of a 1 N solution of sodium acetate in acetic acid. After the mixture had stirred 24 hours at room temperature, 150 ml. of water was added and the resulting precipitate was recovered by filtration, washed, and dried. The dry material was recrystallized from benzene to give 310 mg. of 5,6-dichloro-pregnane-3$\beta$,17-diol-20-one; M. P. 203–206° C. (dec.).

*Example 2*

To a mixture of 15.4 ml. of 1 M chlorine in acetic acid and 32 ml. of 1 N sodium acetate in acetic acid was added 2 g. of 5,6-dichloro-pregnane-3$\beta$,20-diol (M. P. 195–198° C.). The mixture was stirred overnight at room temperature. The solution was then diluted with 200 ml. of water, and the precipitate was recovered by filtration, washed with water, and dried. After recrystallization of the dry material from dilute methanol, and then from a mixture of benzene and petroleum ether there was obtained 0.35 g. of 5,6-dichloro-pregnane-3$\beta$-ol-20-one; M. P. 153–154° C.

The 5,6-dichloro-pregnane-3$\beta$,20-diol used as starting material in this example is conveniently prepared by reacting $\Delta^5$-pregnene-3$\beta$,20-diol with one molecular equivalent of chlorine in chloroform solution.

*Example 3*

To a solution containing 14.38 g. of $\Delta^{16}$-5,6-dichloro-3-acetoxy-20-keto-pregnene dissolved in 1600 cc. of methanol and 80 cc. of benzene was added 24 cc. of 4 N aqueous sodium hydroxide and 52 cc. of 30% aqueous hydrogen peroxide. The resulting mixture was allowed to stand at a temperature of 5° for about 15 hours. The crystalline material which precipitated was recovered by filtration and dried to give 11.34 grams of 16,17-oxido-5,6-dichloro-3-hydroxy-20-keto-pregnane; M. P. 191–192° C. dec.; yield approximately 76% of theory.

The $\Delta^{16}$-5,6-dichloro-3-acetoxy-20-keto-pregnene utilized as starting material in the present example can be prepared as follows: 25 g. of $\Delta^{5,16}$-pregnadiene-3-ol-20-one acetate is dissolved in 850 cc. of chloroform containing 6 cc. of pyridine and the solution is cooled to a temperature of about −60° C. To this solution is added 49.6 cc. of a 1.41 molar solution of chlorine in carbon tetrachloride. The temperature of the resulting mixture is allowed to rise to 15° C., reaction mixture is washed with dilute aqueous hydrochloric acid solution, and then with water until neutral. The chloroform solution is then evaporated to dryness under reduced pressure, acetone is added to the residue and the acetone evaporated therefrom. The residual material thus obtained is triturated with methanol, filtered and dried and the mother liquors evaporated and a second crop recovered therefrom. The combined crystalline material is recrystallized from methanol to give about 19.5 g. of substantially pure $\Delta^{16}$-5,6-dichloro-3-acetoxy-20-keto-pregnane.

*Example 4*

Two grams of 16,17-oxido-5,6-dichloro-3-hydroxy-20-keto-pregnane were dissolved in a mixture of 120 cc. of ether and 100 cc. of benzene, and the resulting solution was added to one gram of lithium aluminum hydride in 100 cc. of ether. The resulting mixture was heated under reflux for a period of about 17 hours. Thirty cc. of ethanol was added to the reaction mixture thereby decomposing excess lithium aluminum hydride and the reaction mixture was then diluted with 500 cc. of water and 20 cc. of concentrated aqueous hydrochloric acid solution. The benzene-ether layer was separated, washed with water and the benzene-ether was evaporated therefrom to give 3,17,20-trihydroxy-5,6-dichloro-pregnane.

*Example 5*

The 3,17,20-trihydroxy-5,6-dichloro-pregnane, prepared as described in Example 4 hereinabove, was dissolved in a solution containing 30 cc. of methanol and 10 cc. of chloroform. To this solution was added 0.4 cc. of pyridine followed by 6 cc. of a 1.81 molar solution of N-bromacetamide in methanol-water. The resulting mixture was allowed to stand in the dark at room temperature for a period of about 4 days. The color of the reaction mixture was discharged by the addition of a sufficient amount of allyl alcohol. To the resulting mixture was added 10 cc. of acetic acid, followed by 700 cc. of water, and the aqueous mixture was extracted with 100 cc. of chloroform. The chloroform extract was washed with a 5% aqueous solution of sodium bicarbonate, then with water, and the chloroform evaporated therefrom under reduced pressure. The residual material was triturated with benzene and the crystalline material which separated was recovered by filtration and dried to give approximately 1.2 g. of unchanged 3,17,20-trihydroxy-5,6-dichloro-pregnane; M. P. 198–9° C.

The benzene filtrate was chromatographed on 40 g. acid-washed alumina using for elution the following: (1) 300 cc. of benzene; (2) 250 cc. of 10% chloroform-benzene; and (3) 600 cc. of 30% chloroform-benzene. Evaporation of the 30% chloroform-eluate gave 400 mg. of 3,17-dihydroxy-5,6-dichloro-20-keto-pregnane; M. P. 201–2° C.

The terms "pregnane" and "$\Delta^{16}$-pregnane" are used herein in the generic sense of including steroid compounds of both the normal and allo pregnane series.

Various changes and modifications may be made in carrying out the present invention without departing from the spirit and scope thereof. Insofar as these changes and modifications are within the purview of the annexed claims, they are to be considered as part of my invention.

I claim:

1. The process which comprises reacting $\Delta^{16}$-5,6-dichloro-3-lower hydrocarbon carbonyloxy 20-keto-pregnene with alkaline hydrogen peroxide to form 16,17-oxido-5,6-dichloro-3-hydroxy-20-keto - pregnane, reacting this compound with an alkali metal aluminum hydride thereby forming 3,17,20-trihydroxy-5,6-dichloro-pregnane, and reacting the latter compound with a positive halogen type oxidizing agent selected from the group which consists of chlorine, N-haloamides and hypohalites to produce 3,17-dihydroxy-5,6-dichloro-20-keto-pregnane.

2. The process which comprises reacting $\Delta^{16}$-5,6-dichloro-3-lower hydrocarbon carbonyloxy 20-keto-pregnene with alkaline hydrogen peroxide to form 16,17-oxido-5,6-dichloro-3-hydroxy-20-keto-pregnane, reacting this compound with an alkali metal aluminum hydride thereby forming 3,17,20-trihydroxy-5,6-dichloro-pregnane, and reacting the latter compound with chlorine to produce 3,17-dihydroxy-5,6-dichloro-20-keto-pregnane.

3. The process which comprises reacting $\Delta^{16}$-5,6-dichloro-3-lower hydrocarbon carbonyloxy 20-keto-pregnene with alkaline hydrogen peroxide to form 16,17-oxido-5,6-dichloro-3-hydroxy-20-keto-pregnane, reacting this compound with an alkali metal aluminum hydride thereby forming 3,17,20-trihydroxy-5,6-dichloro-pregnane, and reacting the latter compound with an N-haloamide to produce 3,17-dihydroxy-5,6-dichloro-20-keto-pregnane.

4. The process which comprises reacting $\Delta^{16}$-5,6-dichloro-3-acetoxy-20-keto-pregnene with hydrogen peroxide in aqueous alkali metal hydroxide solution to form 16,17-oxido-5,6-dichloro-3-hydroxy-20-keto - pregnane, reacting this compound with lithium aluminum hydride thereby forming 3,17,20-trihydroxy-5,6-dichloro-pregnane, and reacting said 3,17,20-trihydroxy-5,6-dichloro-pregnane with N-bromacetamide to produce 3,17-dihydroxy-5,6-dichloro-20-keto-pregnane.

5. The process which comprises reacting $\Delta^{16}$-5,6-dichloro-3-acetoxy-20-keto-pregnene with hydrogen peroxide in aqueous alkali metal hydroxide solution to form 16,17-oxido-5,6-dichloro-3-hydroxy-20-keto-pregnane, reacting this compound with lithium aluminum hydride thereby forming 3,17,20-trihydroxy-5,6-dichloro-pregnane, and reacting said 3,17,20-trihydroxy-5,6-dichloro-pregnane with N-bromsuccinimide to produce 3,17-dihydroxy-5,6-dichloro-20-keto-pregnane.

6. The process which comprises reacting $\Delta^{16}$-5,6-dichloro-3-lower hydrocarbon carbonyloxy 20-keto-pregnene with alkaline hydrogen peroxide to produce 16,17-oxido-5,6-dichloro-3-hydroxy-20-keto-pregnane.

7. The process which comprises reacting $\Delta^{16}$-5,6-dichloro-3-acetoxy-20-keto-pregnene with hydrogen peroxide in aqueous alkali metal hydroxide solution to form 16,17-oxido-5,6-dichloro-3-hydroxy-20-keto-pregnane.

8. The process which comprises reacting 16,17-oxido-5,6-dichloro-3-hydroxy-20-keto pregnane with an alkali metal aluminum hydride thereby forming 3,17,20-trihydroxy-5,6-dichloro-pregnane.

9. The process which comprises reacting 16,17-oxido-5,6-dichloro-3-hydroxy-20-keto-pregnane with lithium aluminum hydride to produce 3,17,20-trihydroxy-5,6-dichloro-pregnane.

10. The process which comprises reacting a 5,6-dichloro-3-hydroxy-steroid of the pregnane series, which contains at least one additional secondary alcohol substituent, with a positive halogen oxidizing agent selected from the group which consists of chlorine, N-haloamides and hypohalites, thereby selectively oxidizing said additional secondary alcohol substituent to ketone without substantially affecting the 3-hydroxy grouping to produce the corresponding keto-substituted-5,6-dichloro-3-hydroxy-steroid.

11. The process of selectively oxidizing the 20-hydroxy substituent of 5,6-dichloro-3,17,20 - trihydroxy - pregnane without substantially affecting the 3-hydroxy grouping, which comprises reacting said 5,6-dichloro 3,17,20-trihydroxy-pregnane with a positive halogen oxidizing agent selected from the group which consists of chlorine N-haloamides and hypohalites thereby producing 5,6-dichloro-3,17-dihydroxy-20-keto-pregnane.

12. The process of selectively oxidizing the 20-hydroxy substituent of 5,6-dichloro-3,20-dihydroxy-pregnane without substantially affecting the 3-hydroxy grouping, which comprises reacting said 5,6-dichloro-3,20-dihydroxy-pregnane with a positive halogen oxidizing agent selected from the group which consists of chlorine, N-haloamides and hypohalites thereby producing 5,6-dichloro-3-hydroxy-20-keto-pregnane.

13. The process of selectively oxidizing the 20-hydroxy substituent of 5,6-dichloro-3,17,20-trihydroxy-pregnane without substantially affecting the 3-hydroxy grouping, which comprises reacting said 5,6-dichloro-3,17,20-trihydroxy-pregnane with chlorine thereby producing 5,6-dichloro-3,17-dihydroxy-20-keto-pregnane.

14. The process of selectively oxidizing the 20-hydroxy substituent of 5,6-dichloro-3,17,20-trihydroxy-pregnane without substantially affecting the 3-hydroxy grouping, which comprises reacting said 5,6-dichloro-3,17,20-trihydroxy-pregnane with an N-haloamide thereby producing 5,6-dichloro-3,17-dihydroxy-20-keto-pregnane.

15. The process which comprises reacting 5,6-dichloro-3,17,20-trihydroxy-pregnane with N-bromacetamide to form 3,17-dihydroxy-5,6-dichloro-20-keto-pregnane.

16. The process which comprises reacting 5,6-dichloro-3,17,20-trihydroxy-pregnane with N-bromsuccinimide to produce 3,17-dihydroxy-5,6-dichloro-20-keto-pregnane.

References Cited in the file of this patent

UNITED STATES PATENTS

| | | |
|---|---|---|
| 2,599,481 | Plattner | June 3, 1952 |
| 2,648,663 | Julian | Aug. 11, 1953 |
| 2,702,810 | Murray | Feb. 22, 1955 |